Figure 1:
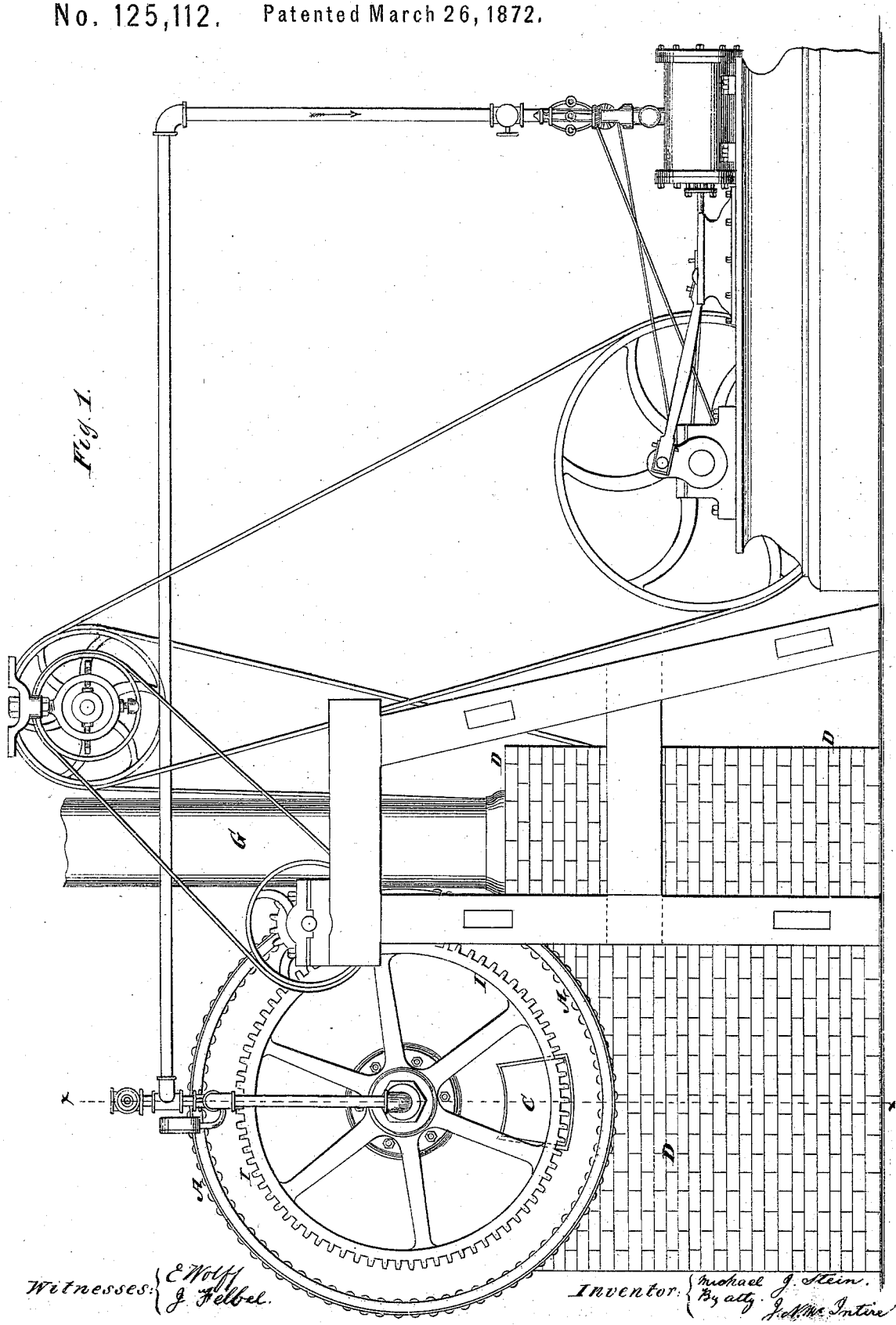

MICHAEL J. STEIN.
Improvement in Rendering Animal Matters and Drying and Pulverizing the same.

No. 125,112.  
3 Sheets--Sheet 2.  
Patented March 26, 1872.

Witnesses:  
E. Wolff  
J. Felbel

Inventor:  
Michael J. Stein  
By atty. J. N. McIntire

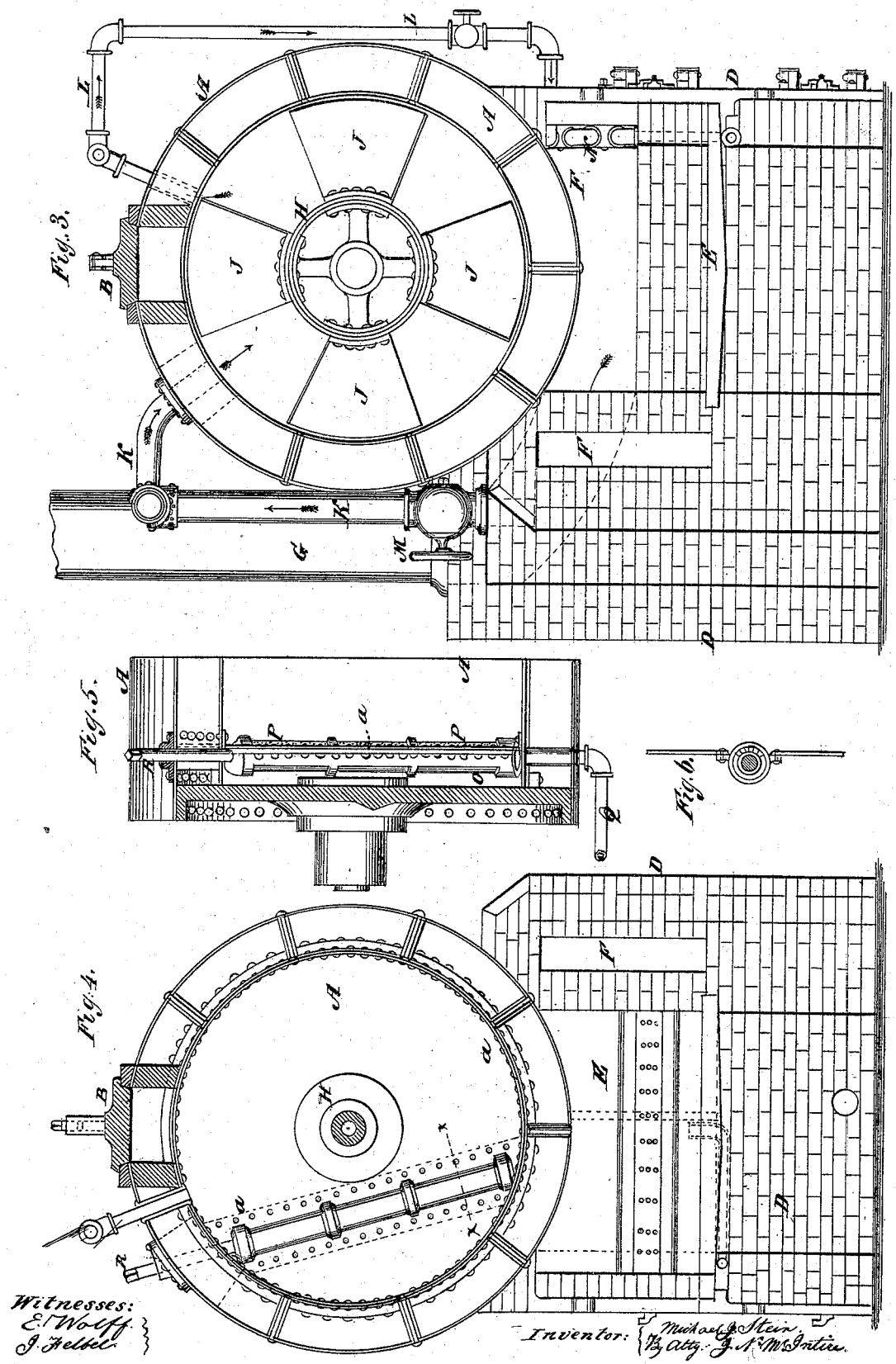

UNITED STATES PATENT OFFICE.

MICHAEL J. STEIN, OF NEW YORK, N. Y.

IMPROVEMENT IN RENDERING ANIMAL MATTERS AND DRYING AND PULVERIZING THE SAME.

Specification forming part of Letters Patent No. 125,112, dated March 26, 1872.

SPECIFICATION.

*To all whom it may concern:*

Be it known that I, MICHAEL J. STEIN, of New York city, in the county and State of New York, have invented a new and useful Continuous Process for the Rendering of Animal Matter and the Drying and Pulverization of the Scrap and the Production of an Improved Fertilizer; and I do hereby declare the following to be a full, clear, and exact description of my said invention, reference being had to the accompanying drawing (of an apparatus for working my said process and producing my new article of manufacture) and the letters marked thereon.

Previous to my invention it has been customary, in processes of rendering out the fat from animal matter and in the manufacture of fertilizers from the residuum (or "scrap") obtained in the rendering operation, to subject the animal matter to the action of steam and other heat in open or closed vessels, to effect the rendering; subsequently subject the wet "scrap" or residuum of the rendering process to a "drying" process in another apparatus; and, finally, grinding the dried scrap in a suitable mill or a pulverizing apparatus, by which the scrap would be reduced to a powdered condition fit to be sold and used as a fertilizer. In the rendering process, when refuse animal matters are treated, the system in which a closed vessel is used is most employed on account of the great nuisance arising from the bad odors usually accompanying the processes of fat-boiling establishments; but when the closed rendering-tanks or digesters are used, with means provided for the burning up of the offensive odors, it is customary, when the rendering is completed, to either immediately discharge the residuum into the open air, or allow it to cool and then discharge it from the tank or digester; in either of which cases the scrap is in a wet or moist condition (containing from forty to fifty per cent. of water) and will give off offensive odors in the decomposition of the matter, which will follow upon exposure, (for a greater or shorter time;) and besides this objection to thus discharging the scrap before its conversion into a fertilizer, it loses by such exposure a large portion of the contained nitrogen or ammonia, which chemical quality or ingredient gives to this fertilizer its real value.

Another great objection to the heretofore-practiced method of treatment (in which, as I have said, the residuum of the rendering process is discharged, then carried to a drying apparatus and process, and then finally conveyed to a pulverizing apparatus) is the great expense, in time, labor, and the consumption of fuel, consequent to the handling of the material and the performance of these successive and separate processes, (in the manner well known.) I propose, by my invention, to overcome all these difficulties and objections, and, by a continuous process, or a series of processes continuously carried on, to effect the rendering out of the fat from animal matter, the extraction of all contained water from or the complete drying of the scrap into a finely-pulverized fertilizer, without the escapement at any time of any offensive or unhealthy odors whatever, and at the same time produce (at less expense) a far superior article of manufacture in the fertilizer made than has been heretofore afforded from the same materials. And to these ends and objects my invention consists in subjecting the matter to be treated to the successive operations of rendering, drying, and pulverizing while confined in a closed vessel or vessels, as will be hereinafter more fully explained; and my invention further consists in the improved article of manufacture resulting from my new process, and hereinafter described more fully.

To enable those skilled in the art to practice my new process and produce the improved article of manufacture, I will proceed to more fully describe my invention, referring by letters to the accompanying drawing of an apparatus adapted to be used in carrying out my invention.

Figure 2:
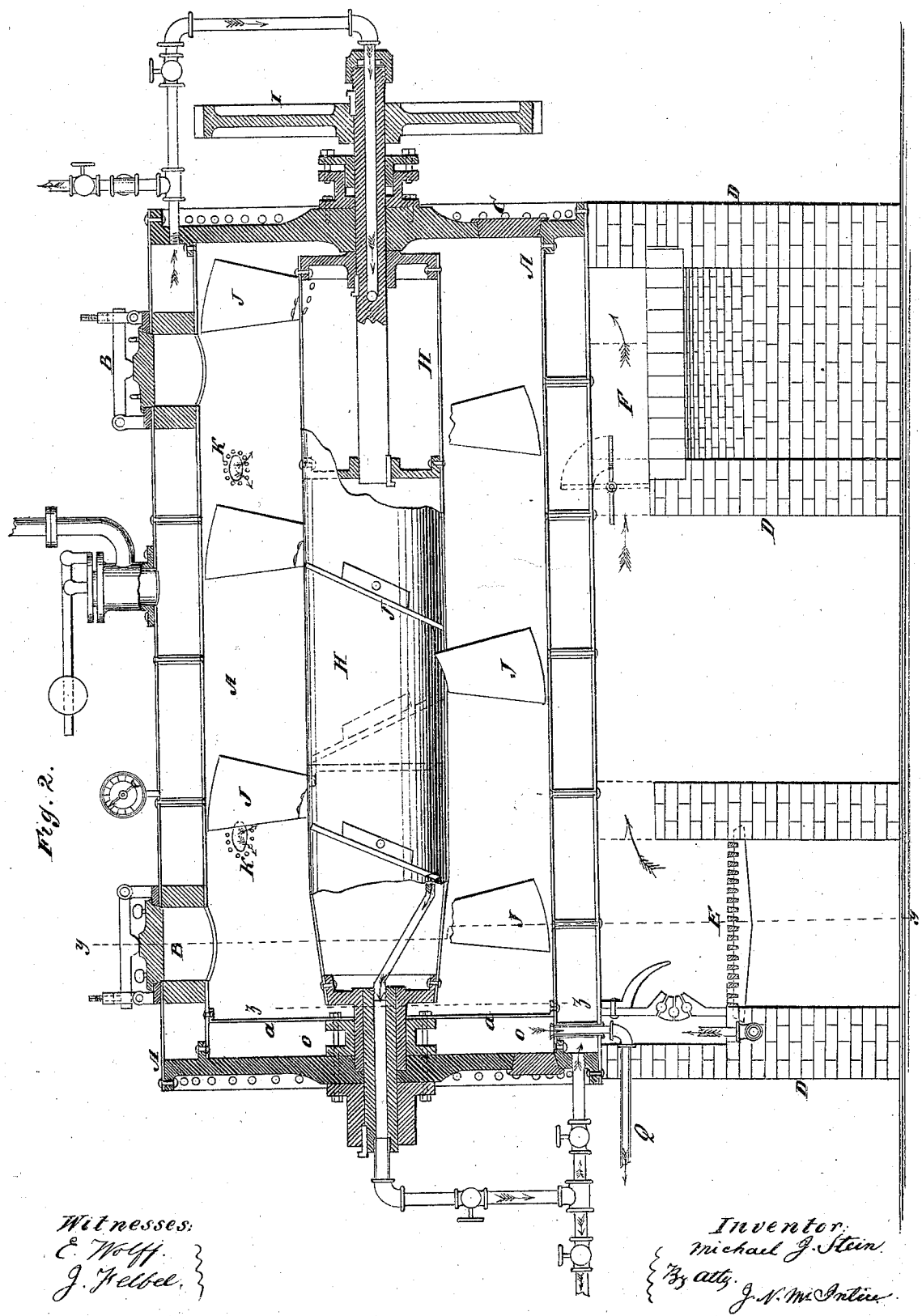

At Fig. 1 is an end view or elevation of an apparatus for carrying on my new "continuous process." Fig. 2 is a vertical longitudinal section at the line $x\,x$, Fig. 1. Fig. 3 is a vertical cross-section at $y\,y$, Fig. 2. Fig. 4 is a similar section at $z\,z$, Fig. 2. Fig. 5 is a partial longitudinal section of tank, (to show the devices for drawing off the liquid;) and Fig. 6 is a detail view of the liquid valve, (a cross-section at $x\,x$, Fig. 4.)

In the several figures the same part is designated by the same letter of reference.

As the apparatus forms no part of my present invention it need be only sufficiently explained to make clear its operation when using it to carry out my new process.

A is the vessel, in which the processes of rendering, drying, and pulverizing are conducted. This vessel or chamber is, as shown, about cylindrical in form, is provided with manholes B B C for the introduction and discharge of material. It is mounted, boiler-like, in brick-work D, in which are a suitable furnace, E, and flues F, leading to a chimney, G. This vessel A is made of boiler-iron, shell-like, and adapted to be supplied with water, and heated up by the steam generated from said water in the manner well known. H is a drum arranged axially within the vessel A, and provided with suitable means for supplying it with steam. It is mounted to turn on journals, is driven or rotated at pleasure (through the medium of a gear, I) by suitable driving mechanism, actuated in any desirable manner, and is provided with numerous arms, J, which act as agitators and pulverizers. K are pipes leading from the heat-flues of the furnace to and communicating with the interior of the vessel A, and provided with suitable valves or cocks at M. These pipes are used to conduct hot air into the vessel A during the drying process. L are pipes extending from the vessel A downward to a superheater, N, and are employed to carry off from the vessel A the vapors and noxious gases, which are to be superheated and consumed. Near one end of the vessel A is a partition, $a$, by which is partitioned off a small compartment, $o$, (see Fig. 2,) into which the fat and other liquid products (of the rendering process) flow through a valve, P, and from which they are discharged through an exit-pipe, $q$. The valve P is made something in the fashion of a register, capable of making and cutting off communication between the compartment $o$ and the main portion of the vessel A, and is provided with a stem or shaft, R, which protrudes through the shell or body of vessel A, and by which said valve may be turned or operated at the will of the attendant. In conducting my process the vessel A is charged in the usual manner, through the man-holes B, with the animal matter to be treated, and the vessel then closed air-tight or hermetically sealed. The shell being supplied with water and the furnace started, I proceed in the usual manner to perform the melting and rendering process, and as the fat (and water) is rendered out it is drawn into compartment $o$ through the valve P, (which is opened at proper intervals,) and from thence carried off through the pipe O and suitable conductors to the coolers. During the rendering operation or process the contents of the digester may be agitated at pleasure, if deemed expedient to facilitate the operation, by causing the drum H, with its arms J, to rotate; and the said drum H being supplied with the heating medium assists the rendering of the fat from the mass contained in vessel A, and the extraction and generation into steam of much of the contained water. The vapors and noxious gases are forced off through the pipes L to the superheater N, and from thence pass into the furnace, where they are consumed and aid in the combustion, by which heat is kept up in the vessel A. As soon as the rendering process has progressed so far as to have extracted or melted out all the fat which it is practical to obtain from the charge, I then (in lieu of either discharging the residuum or allowing it and the rendering-chamber to cool off) proceed to dry the residuum or scrap by setting the stirrers J in motion, (by rotating the drum H,) and by keeping the mass agitated, while the vessel is highly heated, induce the generation into steam (within said vessel) of all the moisture contained in the residuum or scrap. As the generation of the moisture into steam goes on the temperature is kept up to a high degree, and the generated steam, escaping through the pipes L, passes continually to the superheater, where it is dried, and from thence is discharged, in combination with gases, through an argand burner, and assists the fire in the furnace, (which, in turn, heats the steam-generating vessel,) and thus the contained charge of scrap is most economically and effectually dried or deprived of all contained moisture or water. When the scrap has become perfectly dried and partially disintegrated any necessary amount of agitation, by the continued rotation of the drum H, with its arms J, may be employed to effect the reduction of the dried material to a perfect powder or finely-pulverized condition, when the contents, reduced to the proper condition, without the loss of its contained nitrogen or ammonia, and without any noxious gases or vapors having escaped, may be discharged from the vessel, and will be found to be a far superior article for fertilizing purposes than that heretofore produced from the same substances or materials.

I have particularly alluded to the rendering, drying, and reduction to a pulverized fertilizer of solid animal substances; but it will be understood that other substances, such, for instance, as animal blood, may be treated by my process in the described apparatus and from it a better fertilizer produced than has been heretofore made from the same material. In treating blood it is put into the vessel A and subjected to the heating or cooking process until the charge becomes thoroughly coagulated, when it is dried and pulverized in the same manner as already explained with regard to the treatment of solid matters.

It will be seen that by my continuous process or the subjection of the material to the necessary processes successively, and while confined in the heated chamber or vessel used for the cooking or rendering process, a great saving in time, labor, and fuel is attained, while at the same time any escape of noxious vapors or gases is wholly avoided, thus overcoming entirely the heretofore unavoidable nuisance connected with the processes of fat-boiling and the manufacture from animal matter of fertilizers; and it will also be understood that by my continuous process, or by the subjection of the animal matter to all the necessary processes for the production of the fertilizer, while closely confined, (to prevent the escape, during the conversion of the substance from its original to its final condition, of any ammonia,) as described, a product is derived which contains a larger amount or proportion of ammonia, and which is consequently a more valuable article of manufacture. I wish it to be understood that the apparatus employed for carrying on my new or "continuous" process and for the production of my improved article of manufacture may be like that shown and described, or substantially different, the machinery used forming no part of my invention; and it may be any apparatus in which it is practicable to perform the successive processes without permitting the material to be exposed openly from the beginning to the end of the processes.

Having sufficiently explained my new process and improved article of manufacture to enable a skilled person to work the former and produce the latter, I am aware that a fertilizer as an article of trade has been made by subjecting refuse matter, after the rendering process and after being dried to a pulverizing process; but it has invariably been the custom to remove the refuse from the vessel in which it was rendered (either before or after drying) before it is pulverized, so that it has invariably been exposed to the action of the air and thereby robbed of part of its ammonia. The article produced by my process is not allowed to come in contact with the air in any stage of the process of treatment, and not until the animal refuse matter has been reduced to a powder. I do not wish, therefore, to claim broadly the powdered refuse as an article of trade; but

What I claim as new, and desire to secure by Letters Patent, is—

1. As a new process in the treatment of animal matters for the extraction of the fat and water and production of a fertilizing scrap, subjecting the material to a heating or rendering operation, and drying operation, and a pulverizing or disintegrating operation in a closed vessel, substantially as described.

2. As an improved article of manufacture, a fertilizer derived from the treatment of animal matters in a confined condition, substantially as hereinbefore described.

In testimony whereof I have hereunto set my hand and seal this 5th day of March, 1872.

MICHAEL J. STEIN. [L. S.]

In presence of—
J. N. McINTIRE,
CHAS. E. WARREN.